United States Patent

[11] 3,629,607

| | | |
|---|---|---|
| [72] | Inventor | Gregory A. Maddox<br>Los Angeles, Calif. |
| [21] | Appl. No. | 69,818 |
| [22] | Filed | Sept. 4, 1970 |
| [45] | Patented | Dec. 21, 1971 |
| [73] | Assignee | Cam-Stat Incorporated<br>Los Angeles, Calif. |

[54] THERMOSTAT WITH HEAT ANTICIPATION AND VOLTAGE REGULATION
4 Claims, 3 Drawing Figs.

[52] U.S. Cl......................................................... 307/117,
337/1, 317/132
[51] Int. Cl........................................................ H01h 37/00
[50] Field of Search................................................ 337/1;
307/117, 116, 118, 112, 318; 317/234.30, 132

[56] References Cited
UNITED STATES PATENTS
3,088,053  4/1963  Gately.......................... 317/132 X

*Primary Examiner*—Herman J. Hohauser
*Attorney*—Harris, Kiech, Russel & Kern

ABSTRACT: A thermostat for controlling a room heating system or the like and operable from a widely varying electric power source, such as the battery of a mobile home or trailer or camper. A thermostat with a thermally responsive bimetal member operating a switch as a function of temperature, a heating resistor positioned adjacent the bimetal member for heat anticipation, and a voltage regulating Zener diode in circuit with a current dropping resistor and the heating resistor to provide constant heating current and thereby constant anticipation while the voltage of the power source fluctuates over a wide range.

PATENTED DEC 21 1971

3,629,607

INVENTOR
GREGORY A. MADDOX
By His Attorneys
HARRIS, KIECH, RUSSELL & KERN 3,629,607

THERMOSTAT WITH HEAT ANTICIPATION AND VOLTAGE REGULATION

This invention relates to a thermostat for control of a heating system for a room or the like, and in particular to a new and improved thermostat providing accurate and precise temperature control while operating from an electrical power source having a widely fluctuating output voltage. The problem is particularly severe in heating systems in mobile homes, trailers and campers where the DC power supplies have poor regulation.

The better quality thermostats in use today utilize heat anticipation wherein a source of heat is incorporated in the thermostat adjacent the thermally sensitive member to cause the thermostat to shutoff the heat source before the ambient temperature reaches the temperature at which the member would normally shutoff the heat source, thereby narrowing the temperature swing in the room being heated. Thermostats with heat anticipation are currently in use and one typical unit is shown in U.S. Pat. No. 3,249,721.

In a heat anticipation system, an electrical resistor is typically used as the source of the heat, and the heat output of a resistor is a function of the voltage applied to the resistor. Where this applied voltage varies, the heat supplied by the anticipation system will also vary and result in a variable and adverse operation of the thermostat. Accordingly, it is an object of the present invention to provide a new and improved heat anticipation type of thermostat which can operate with an electrical power source of widely fluctuating output without adversely affecting the heat anticipation system and the operating range. A further object is to provide such a thermostat incorporating a simple, inexpensive, reliable and accurate electrical circuit for control of the heat anticipation.

A preferred embodiment of the invention incorporated in a specific thermostat is disclosed in the drawing and specification, but it will be understood that the invention may readily be adapted for use with other room thermostat constructions.

Figure 1:
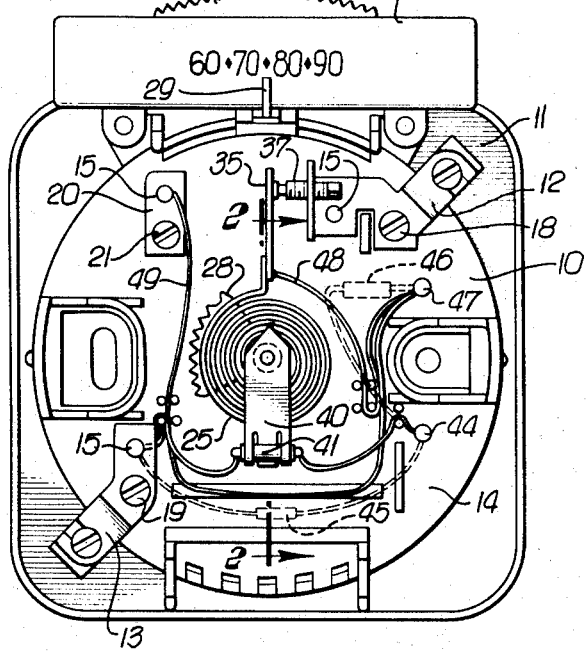
FIG. 1 is a front view of a thermostat with the cover removed and incorporating a preferred embodiment of the present invention.
Figure 2:
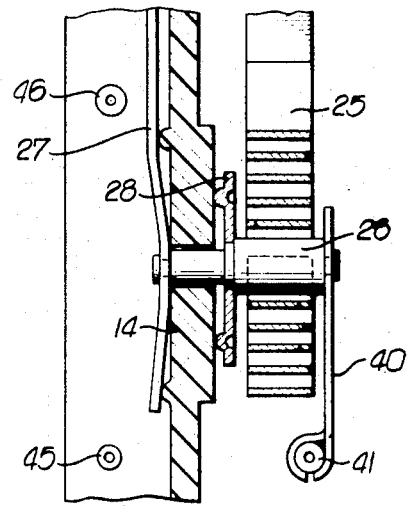
FIG. 2 is an enlarged partial sectional view taken along the line 2—2 of FIG. 1.

A thermostat indicated generally at 10 is mounted on a base 11 by screws passing through slots in metal ears 12, 13, the ears being affixed to a plate 14 of the thermostat by rivets 15. In a typical installation, the mounting base 11 is affixed to the wall of a room being heated and the thermostat 10 is subsequently attached to the mounting base. The base 11 and the plate 14 are made of a molded plastic or other low thermal conductivity and electrical insulating material.

The metal ear 12 also serves as an electrical terminal and a wire may be connected to the ear by a screw 18. The metal ear 13 also serves as an electrical terminal and a wire may be affixed thereto by the screw 19. Another metal strip 20 is fastened to the plastic plate 14 by a rivet 15 and also serves as an electrical terminal, with a wire affixed thereto by a screw 21.

A thermally responsive member in the form of a helical bimetal strip 25 is fixed on a shaft 26 which is pivotally mounted in the plate 14 by a lever 27 and a plate 28, both of which are fixed to the shaft 26. A pointer 29 and serrated section 30 are provided at the outer end of the lever 27, with the pointer moving along a scale plate 31 as the section 30 is manually adjusted to rotate the shaft 26. The scale plate 31 is mounted on the thermostat plate 14.

The moving arm 35 of an electrical switch 36 is carried on the outer end of the thermal member 25. The fixed contact 37 of the switch 36 is mounted on the plate 12. The thermally responsive member and switch are conventional units and various forms of these components are available.

A metal plate 40 is mounted on the shaft 26 which also is of metal, to provide good thermal conductivity from a resistor 41 carried in the outer end of the plate 40 to the thermal member 25. The resistor 41 is connected between the terminal plate 13 and a terminal post 44. A Zener diode 45 is also connected between the terminal plate 13 and the terminal post 44, with the diode 45 being separated from the resistor 41 and thermal member 25 by the thermostat plate 14. Another resistor 46 is connected between the terminal post 44 and another terminal post 47 which is connected to the moving switch arm 35 by a conductor 48. The terminal post 47 is also connected to the terminal plate 20 by a conductor 49. The resistor 46 is mounted on the same side of the plate 14 as the diode 45.

Figure 3:
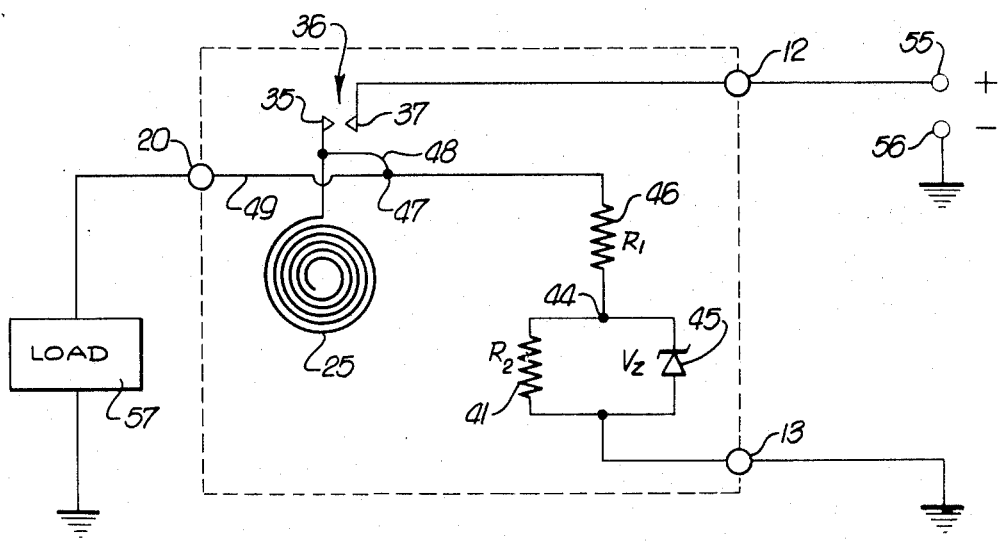
FIG. 3 is an electrical diagram of the thermostat of FIG. 1.

In operation, one terminal 55 of an electric power source is connected to the terminal 12 and the other terminal 56 of the source is connected to the terminal 13, via circuit ground as shown in FIG. 3. A load 57 is connected between the terminal 20 and circuit ground with the load typically being the solenoid or relay which turns on the furnace.

In considering the operation of the thermostat, assume that the room in which the temperature is being controlled is at the desired temperature and the switch 36 is open. When the temperature in the room drops to a lower value, the thermal member 25 will cause the switch arm 35 to move clockwise and close the switch 36. This will apply electric power to the load and turn on the heating system. As the temperature in the room increases, the thermal member 25 will tend to move the arm 35 counterclockwise and will ultimately pen the switch 36.

Closing the switch 36 also applies electric power to the network comprising the resistor 46, the resistor 41 and diode 45. Current in the resistor 41 produces heat which is generated locally with respect to the thermal member 25 and which is combined with the heat being produced in the room. This additional heat from the resistor 41 causes the thermal member to move counterclockwise and open the switch 36 earlier than it normally would. This method of control is sometimes referred to as anticipation or heat anticipation and is used to turn off the heat source before the room temperature reaches the normal turnoff temperature and thereby reduce the temperature swing normally encountered in the thermostatically controlled heat source.

When the voltage applied to the resistor 41 varies, the heat produced by the resistor will vary and the amount of heat anticipation will vary. This becomes a serious problem when the voltage of the power source at terminals 55, 56 varies. The present invention provides for maintaining a constant voltage across the heating resistor 41 thereby generating a constant amount of heat and providing for constant anticipation.

The magnitude of the resistor 46 is chosen to maintain the diode 45 in the avalanche state over the voltage range of the source at the terminals 55, 56. The current through the resistor 46 is the sum of the currents through the diode 45 and resistor 41. As the voltage at the terminals 12, 13 varies, the impedance of the diode 45 will vary and maintain a constant voltage across the diode 45 and resistor 41. Hence the current through the resistor 41 is constant and the heat generated thereby is constant.

In the embodiment illustrated, the heat generated by the resistor 41 is conducted to the center of the helical member 25 via the plate 40 and shaft 26, with the center portion of the helix being the most active portion and thereby the portion most responsive to temperature change. At the same time, the other heat sources, namely the diode 45 and resistor 46, are positioned remote from the member 25 with the plate 14 therebetween, providing a good thermal barrier.

Tests were performed on a thermostat constructed as illustrated and described herein and on an identical unit with the resistors 41, 46 and diode 45 omitted. Each unit was cycled on and off 5 times at each of three input voltages 11, 14.5 and 18 volts. The conventional test procedure was utilized with the thermostats in a constant temperature room and with the set point adjusted to initially close the switch.

The on (switch closed) time, off (switch open) time and total cycle time for the unit of the invention are set out in table I and the data for the conventional unit appears in table II, with time given in minutes. With the thermostat of the invention the average cycle time dropped from about 9.7 minutes to about 8.7 minutes when the voltage was increased from 11 to 18 volts. With the conventional instrument, the average cycle time dropped from about 9.6 minutes to about 3.1 minutes for the same supply voltage range. A total cycle time of 3 minutes is very undesirable in most situations and results in many complaints of fast cycling of the furnace which is being controlled by the thermostat.

TABLE I

| Cycle: | 11 volts | | | 14.5 volts | | | 18 volts | | |
|---|---|---|---|---|---|---|---|---|---|
| | On time | Off time | Total | On time | Off time | Total | On time | Off time | Total |
| 1 | 4.9 | 4.5 | 9.4 | 4.4 | 4.5 | 8.9 | 4.0 | 4.4 | 8.4 |
| 2 | 5.0 | 4.7 | 9.7 | 4.2 | 4.6 | 8.8 | 4.2 | 4.6 | 8.8 |
| 3 | 5.0 | 5.1 | 10.1 | 4.5 | 4.0 | 8.5 | 4.4 | 4.9 | 9.3 |
| 4 | 4.3 | 5.3 | 9.6 | 4.1 | 5.3 | 9.4 | 4.2 | 5.0 | 9.2 |
| 5 | 4.2 | 5.3 | 9.5 | 4.0 | 4.9 | 8.9 | 4.2 | 4.7 | 8.9 |

TABLE II

| Cycle: | 11 volts | | | 14.5 volts | | | 18 volts | | |
|---|---|---|---|---|---|---|---|---|---|
| | On time | Off time | Total | On time | Off time | Total | On time | Off time | Total |
| 1 | 4.4 | 5.0 | 9.4 | 2.2 | 2.6 | 4.8 | 1.5 | 1.6 | 3.1 |
| 2 | 4.6 | 5.0 | 9.6 | 2.1 | 2.6 | 4.7 | 1.5 | 1.7 | 3.2 |
| 3 | 4.5 | 5.3 | 9.8 | 2.1 | 2.6 | 4.7 | 1.5 | 1.5 | 3.0 |
| 4 | 4.8 | 4.8 | 9.6 | 2.1 | 2.5 | 4.6 | 1.5 | 1.5 | 3.0 |
| 5 | 4.6 | 4.9 | 9.5 | 2.0 | 2.7 | 4.7 | 1.5 | 1.7 | 3.2 |

I claim:

1. In a thermostat, the combination of:

a base;

first and second terminals on said base for connection to an electric power source;

a third terminal on said base for connection to a load;

an electrical switch on said base and connected between said first and third terminals;

a first electrical resistor and a voltage regulating diode on said base and connected in series between said second and third terminals;

a thermally responsive member carried on said base and coupled to said switch for closing and opening said switch as a function of temperature;

a second electrical resistor connected across said diode; and means for mounting said second resistor thermally adjacent said member.

2. A thermostat as defined in claim 1 in which said mounting means comprises a metal plate fixed to said member, with said second resistor carried on said metal plate.

3. A thermostat as defined in claim 2 in which said housing includes a wall of material of low thermal conductivity, with said first resistor and diode disposed on one side of said wall and with said member and second resistor disposed on the other side of said wall.

4. A thermostat as defined in claim 1 in which said diode is a Zener-type diode.

* * * * *